US011622508B2

(12) United States Patent
Meews et al.

(10) Patent No.: US 11,622,508 B2
(45) Date of Patent: Apr. 11, 2023

(54) METHOD AND DEVICE FOR CULTIVATING A CROP

(71) Applicant: Priva Holding B.V., De Lier (NL)

(72) Inventors: Gerardus Johannes Jozef Maria Meews, Sterksel (NL); Cornelia Henrica Petronella Maria Meeuws-Aben, Sterksel (NL); Marc Kreuger, Grootebroek (NL); Cornelis Marinus Gijsbertus Adrianus Maria Breukel, Delft (NL)

(73) Assignee: PRIVA HOLDING B.V., De Lier (NL)

( * ) Notice: Subject to any disclaimer, the term of this patent is extended or adjusted under 35 U.S.C. 154(b) by 276 days.

(21) Appl. No.: 16/483,565

(22) PCT Filed: Feb. 6, 2018

(86) PCT No.: PCT/NL2018/050079
§ 371 (c)(1),
(2) Date: Aug. 5, 2019

(87) PCT Pub. No.: WO2018/147728
PCT Pub. Date: Aug. 16, 2018

(65) Prior Publication Data
US 2020/0093069 A1 Mar. 26, 2020

(30) Foreign Application Priority Data
Feb. 7, 2017 (NL) .................................. 2018324

(51) Int. Cl.
A01G 7/04 (2006.01)
A01G 9/24 (2006.01)

(52) U.S. Cl.
CPC ............. A01G 7/045 (2013.01); A01G 9/246 (2013.01); A01G 9/249 (2019.05)

(58) Field of Classification Search
CPC ......... A01G 7/045; A01G 9/249; A01G 9/246
See application file for complete search history.

(56) References Cited

U.S. PATENT DOCUMENTS 3,124,903 A * 3/1964 Truhan ................... A01G 9/246
47/17
2011/0302838 A1 12/2011 Chen et al.
(Continued)

FOREIGN PATENT DOCUMENTS

CN 101642032 A 2/2010
CN 202095348 U 1/2012
(Continued)

OTHER PUBLICATIONS

Machine translation of JP-H04207128-A (Year: 2022).*
(Continued)

Primary Examiner — Yvonne R Abbott-Lewis
(74) Attorney, Agent, or Firm — Nixon & Vanderhye

(57) ABSTRACT

In a method and device for cultivating a crop, cultivation takes place in an at least a substantially daylight-free, climate-conditioned cultivation space. The cultivation space extends between a first side and an opposite second side, wherein the crop is exposed to photosynthetically active radiation from an array of spatially separated artificial light sources. An airflow is guided over the crop from the first side to the second side. The artificial light sources are spatially distributed over the crop. Downstream light sources of the array of light sources produce a higher dosage of photosynthetically active radiation than light sources located further upstream as seen in the flow direction of the airflow guided over the crop.

20 Claims, 1 Drawing Sheet

(56) References Cited

U.S. PATENT DOCUMENTS

Figure 1:
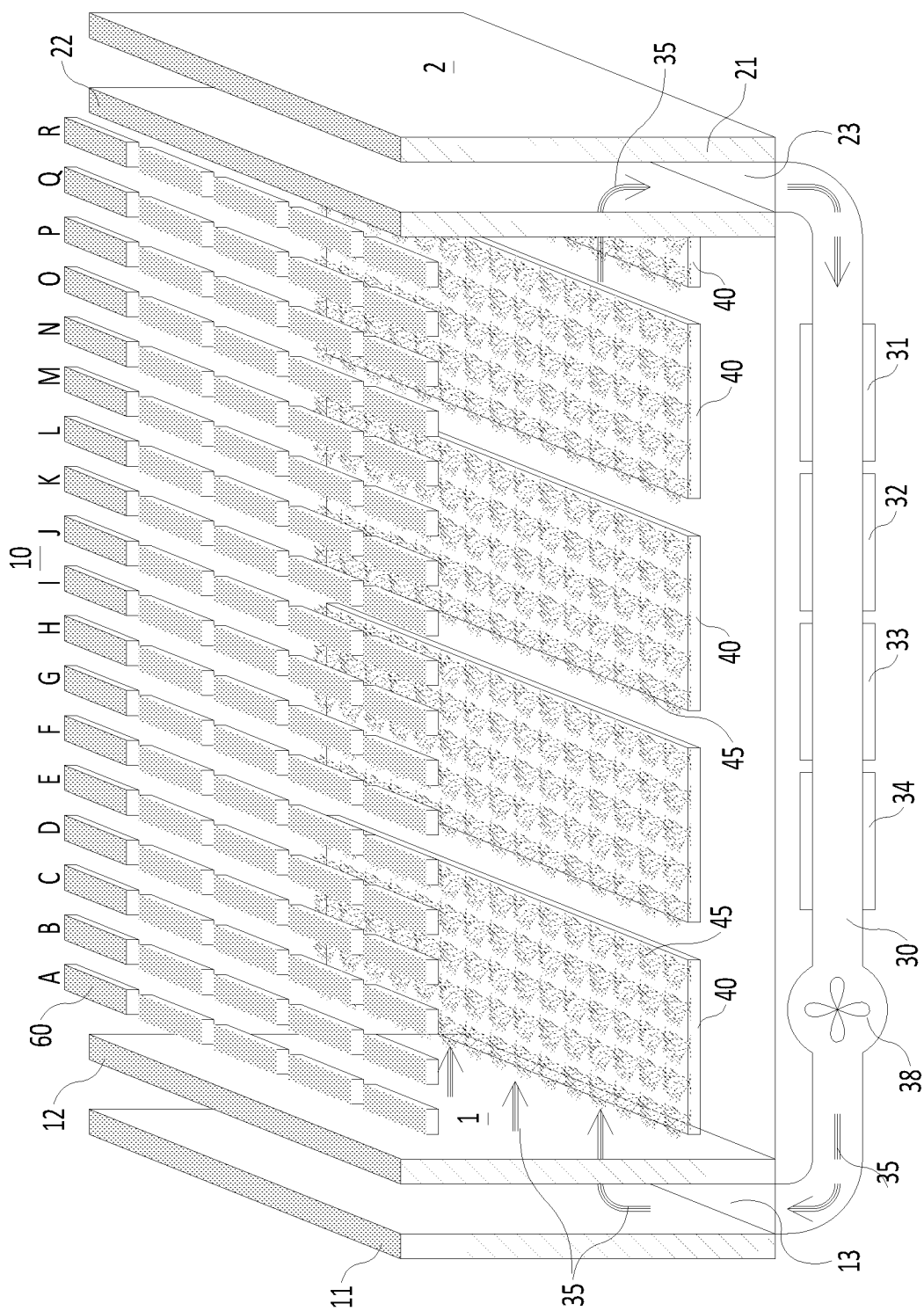

| | | | | |
|---|---|---|---|---|
| 2013/0000185 | A1* | 1/2013 | Tanase | A01G 9/249 47/17 |
| 2013/0122800 | A1* | 5/2013 | Lee | A01G 9/246 454/258 |
| 2014/0215917 | A1 | 8/2014 | Suzuki et al. | |
| 2015/0342125 | A1* | 12/2015 | Krijn | H05B 47/105 315/152 |
| 2016/0014977 | A1 | 1/2016 | Esaki et al. | |
| 2017/0192154 | A1 | 7/2017 | Gilley et al. | |
| 2017/0339847 | A1* | 11/2017 | Lin | A01G 9/246 |
| 2018/0160632 | A1* | 6/2018 | Voermans | A01G 9/246 |
| 2018/0235155 | A1* | 8/2018 | Funamori | A01G 9/249 |

FOREIGN PATENT DOCUMENTS

| | | |
|---|---|---|
| CN | 103120100 A | 5/2013 |
| CN | 204335434 U | 5/2015 |
| CN | 105307476 A | 2/2016 |
| CN | 105407706 A | 3/2016 |
| CN | 108738915 A | 11/2018 |
| EP | 1 639 884 A1 | 3/2006 |
| EP | 2 132 977 A1 | 12/2009 |
| GN | 102245012 A | 11/2011 |
| JP | H03-018737 U | 2/1991 |
| JP | H04-207127 A | 7/1992 |
| JP | H04-207128 A | 7/1992 |
| JP | 2012-000028 A | 1/2012 |
| JP | 2012-125196 A | 7/2012 |
| JP | 2014-166179 A | 9/2014 |
| JP | 2015-208296 A | 11/2015 |
| KR | 101 034 513 | 5/2011 |
| WO | 2008/123448 A1 | 10/2008 |
| WO | 2012/067499 A1 | 5/2012 |
| WO | WO 2014/098735 | 6/2014 |
| WO | WO 2017/012644 | 1/2017 |

OTHER PUBLICATIONS

International Search Report, PCT/NL2018/050079, dated Jun. 5, 2018.
Office Action issued in Chinese Patent Application No. 201880010491.4 dated Mar. 30, 2021.
Office Action issued in Chinese Patent Application No. 201880010491.4 dated Sep. 16, 2021.
NL Search Report issued in NL Patent Application No. 2018324 dated Jul. 7, 2017.
Notice of Grant issued in Chinese Patent Application No. 201880010491.4 dated Mar. 2, 2022.

* cited by examiner

METHOD AND DEVICE FOR CULTIVATING A CROP

The present invention relates to a method for cultivating a crop in an at least substantially daylight-free, climate-conditioned cultivation space, which cultivation space extends between a first side and an opposite second side, wherein the crop is exposed to photosynthetically active radiation from an array of spatially separated artificial light sources and wherein an airflow is guided over and/or through the crop in a direction running from the first side to the second side. The invention also relates to a device for cultivating a crop, comprising an at least substantially daylight-free, climate-conditioned cultivation space, which cultivation space extends between a first side and an opposite second side, at least one array of spatially separated artificial light sources for generating and emitting photosynthetically active radiation to which the crop is exposed, and comprising airflow means for guiding an airflow through the cultivation space in a direction running from the first side to the second side.

A method and device of the type described in the preamble are known under various designations such as horticulture, indoor farming, indoor growing, city farming or vertical farming, and will be referred to below simply as indoor farming. This involves a controlled cultivation and production of crops under artificial growth conditions, such as artificial light and an at least partially conditioned climate. This provides the possibility, particularly in urban areas, of carrying out underground indoor farming if desired, and also has significant advantages compared to traditional horticulture. The natural growth cycle from seed to harvest can thus for instance be significantly shortened because it is no longer controlled by the day/night rhythm of natural sunlight. Indoor farming is therefore seen as an important link in solving the worldwide issue of food security for the ever increasing world population.

Inside the cultivation space in which cultivation thus takes place under artificial conditions the crop is exposed in the known method and device to artificial light from artificial light sources. In addition to generating photosynthetically active radiation, also referred to below as PAR radiation, these artificial light sources also generate heat. In order to nevertheless maintain a space temperature at a desired value, an airflow is therefore guided over and/or through the crop in which at least a part of this heat dissipates. In addition to an ambient temperature, other air conditions in the cultivation space can also be controlled with this airflow, such as a desired relative air humidity and carbon dioxide concentration. This means in practice that fresh air flows into the cultivation space from the first side of a cultivation area and is extracted and guided away on the second side. Along the way the airflow will heat up as more light sources progressively dissipate heat therein. The air temperature on the second side will hereby become higher than the temperature at which the air was introduced into the cultivation space on the first side. In the known method and device this rise in temperature is only permissible within narrow limits because a crop growth on the second side would otherwise deviate too much from that on the first side. This therefore imposes limits on the maximum distance from the first side to the second side, and thereby on the maximum distance over which the cultivation space may and can extend between these opposite sides, and thereby imposes limits on the economic efficiency of the device.

The present invention therefore has for its object, among others, to provide d and device for conditioned cultivation and production of crops in a daylight-free environment which allows a greater deviation in the ambient temperature between the first and second sides of the cultivation space.

In order achieve the stated object a method of the type described in the preamble has the feature according to the invention that the array of artificial light sources is spatially distributed over the crop at least in the direction running from the first side to the second side and that a higher dosage of photosynthetically active radiation is provided to the crop with light sources of the array of light sources located further downstream than with light sources located further upstream as seen in the flow direction of the airflow guided over the crop. A device of the type described in the preamble has for this purpose the feature according to the invention that the array of artificial light sources is spatially distributed over the cultivation space at least in the direction running from the first side to the second side, and that light sources of the array of light sources located further toward the second side are able and configured to be operated at a higher overall dosage of photosynthetically active radiation than light sources located further toward the first side.

In the method and in the device according to the invention a higher dosage of photosynthetically active radiation is thus provided per illumination period to the crop on the second, warmer side of the cultivation space than on the first, relatively colder side. This makes it possible for the photosynthesis of the crop on both sides of the cultivation space, as well as therebetween, to at least largely keep pace with the speed of growth. This growth will inevitably progress more quickly on the warm side than in the colder zone but, because of the greater availability of photosynthetically active radiation, the production of constituent substances will likewise progress more quickly here. A preferred embodiment of the method according to the invention therefore has the feature that a local dosage of photosynthetically active radiation to which the crop is subjected is adapted to a local growth speed of the crop, and in particular is controlled in direct proportion thereto. A content of constituent substances in the harvest-ready product can thus be controlled within narrow limits to a constant level over the whole cultivation area irrespective of the inevitable heating of the airflow, which allows a greater distance between the first and second sides of the cultivation area.

Because of the invention a largely uniform product can ultimately be harvested over the whole cultivation area, which will take place on the warmer second side sooner than on the first side. A particular embodiment of the method according to the invention has for this purpose the feature that products which are cultivated downstream are harvested earlier than products cultivated further upstream as seen in the flow direction of the airflow guided over and/or through the crop. Although harvesting takes place earlier here on the second side, the product at that location will be largely the same in terms of growth and constituents (substances) as the product that is harvested only later on the first side.

What the invention achieves in essence is that the crop which grows more quickly due to the higher temperature is subjected to an increased photosynthesis. With this in mind a larger dosage, or amount, of photosynthetic radiation is provided so that the total amount of photosynthetic radiation which the crop has received here over a whole cultivation period is at least largely equal to the total amount of PAR radiation that has been received elsewhere in a longer cultivation period by a crop located further upstream.

More light sources can be provided downstream in order to achieve this, although in a preferred embodiment the method according to the invention is characterized in that downstream light sources of the array of light sources are operated at a higher intensity of photosynthetically active radiation than light sources located upstream. Extra PAR radiation does not therefore require any additional space for accommodating extra light sources, nor an additional investment therein. A particular embodiment of the device according to the invention has for this purpose the feature that the light sources comprise individual light fittings which can be operated at a variable intensity of photosynthetically active radiation, wherein a preferred embodiment of the device according to the invention is characterized in that the light fittings each comprise a number of light sources, in particular a number of light-emitting diodes (LEDs), which light sources are controllable individually or in groupwise manner within the fitting.

In a further preferred embodiment the method according to the invention is characterized in that the airflow is guided as an at least substantially laminar flow over the crop. A particular embodiment of the device according to the invention has for this purpose the feature that the airflow means comprise on the first side a plenum wall from which the airflow exits during operation as an at least substantially laminar airflow, and that the airflow means comprise on the second side a plenum wall in which the airflow is received during operation as an at least substantially laminar airflow. Not only can an air velocity over the crop thus be regulated within acceptable limits, this enhancing the crop development, it is thus also possible in respect of the airflow to assume a practically constant heating per metre of distance. It is then possible to take advantage of this according to the invention by providing a greater dosage of PAR radiation optionally continuously to the crop per metre of distance.

A practical embodiment of the method is characterized here in that a higher dosage of photosynthetically active radiation is generated stepwise in a number of steps in the direction of the airflow with the light sources of the array of light sources, in particular by operating the light sources stepwise at a gradually higher intensity of photosynthetically active radiation. Such a stepwise adaptation of the PAR level is found in practice to he sufficient to provide a sufficiently uniform harvestable product over the whole cultivation area.

Use is particularly made in the context of the invention of a closed cultivation environment in order to conserve energy and to exclude outside influences as far as possible. A complete control of the growth process can thus be achieved. To this end a particular embodiment of the invention according to the invention has the feature that circulation means are provided to guide back and circulate the airflow from the second side to the first side. With a view to a desired ambient climate in the cultivation space a preferred embodiment of the device according to the invention has the feature here that the circulation means comprise air treatment means which are able and configured to treat the airflow before reintroducing the airflow into the cultivation space, and more particularly that the air treatment means impose at least one of a temperature, relative air humidity and a carbon dioxide concentration on the airflow.

The invention will now be further elucidated on the basis of an exemplary embodiment and an accompanying drawing. In the drawing:

FIG. 1 shows a schematic representation of an exemplary embodiment of a device with a cultivation space according to invention;

The FIGURE is otherwise purely schematic and not (always) drawn to scale. Some dimensions in particular may be exaggerated to greater or lesser extent for the sake of clarity. Corresponding parts are designated in the FIGURE with the same reference numeral.

The cultivation environment of FIG. 1 comprises a climate cell 10 which extends from a first side 1 to an opposite second side 2. A plenum wall 11,12 on the first side with a cavity 13 therein forms a boundary of the cultivation space on the first side, while an opposite second plenum wall 21,22 with a cavity 23 therein hounds the cultivation space on the opposite second side. Both frontal walls 12,22 facing toward the cultivation space are provided aver their whole surface with air openings (not shown). Situated in the cultivation space are a number of crop tables 40 on which a crop 45 is cultivated. This involves daylight-free cultivation under artificial light from an array of light fittings 60.

Light fittings 60 comprise in this example a large number of light-emitting diodes (LEDs) which emit photosynthetically active radiation, or radiation which enables the leaf (green) of the crop to sustain a photosynthetic carbon dioxide assimilation. The diodes are accommodated in a number of separate fittings 60 and are controllable individually or group wise therein in respect of intensity. It is noted here that, where reference is made in the present application to a light source, this can be understood to mean such a diode per se as well as a fitting in which the diode is accommodated in a collective of diodes, optionally in combination with other sources of radiation. Light fittings 60 are distributed in regular manner over the crop and thereby produce a substantially homogenous radiation pattern on crop 45, wherein each plant receives sufficient PAR radiation.

The FIGURE shows a single climate cell 10, although in practice a cultivation device will comprise a number of such climate cells adjacently of and/or above one another, wherein the same crop may or may not be cultivated in the individual cells. And, although only one layer is shown in the FIGURE, cultivation can in practice also take place in multiple layers, wherein the setup shown in the FIGURE is repeated in the height a number of times, for instance six to eight times.

An air circulation system 30 debouches in cavity 13 of first plenum 11,12. The air resistance of the air openings therein or other internal distribution system in the cavity provides for a uniform distribution of the supplied air over wall 12, whereby it leaves the plenum as a laminar airflow 35 and is guided over, through and along crop tables 40 on which a crop 45 is being cultivated. Through the distribution of airflow 35 over at least a large part of wall 12 the air velocity of airflow 35 can be kept sufficiently low while a sufficient flow rate over the crop is nevertheless realized with which a climate in the cultivation space can be conditioned to desired values. The air velocity of the laminar airflow 35 can in this example be limited particularly to a value atypically 0.2-0.8 m/s.

On an opposite side airflow 35 is received via the air openings also provided here in frontal wall 22 and discharged from the second plenum via cavity 23. The circulation means comprise a number of air treatment devices 31 . . . 34 in combination with a fan or pump 38 with which airflow 35 is continuously treated and kept recirculating. The air treatment devices here impose a specific, and as such set air humidity and temperature on the airflow and also provide for a desired carbon dioxide concentration. In addition, a filtering and/or similar installation can be provided therein to eliminate undesirable particles and micro-organisms from the airflow. A clean laminar airflow 35 with an ambient climate geared to crop 45 will hereby always enter climate cell 10 on first side 1.

In addition to PAR radiation, light fittings 60 inevitably also generate heat in the form of convection and radiation. This heat is at least partially absorbed by the passing airflow, whereby the airflow, and thereby the space temperature, will increase downstream, i.e. in a direction from first side 1 to second side 2. This temperature variation along the length from first side 1 to the opposite second side 2 of the cultivation space depends on the light level of the light sources and the flow rate and the velocity of the airflow guided through the space.

The crop 45 placed closer to second wall 21,22 will, as a result of this locally higher space temperature, grow more quickly than the crop located adjacently of first wall 11,12. It is however generally desirable that a largely uniform harvest-ready product be obtained irrespective of the position in the cultivation space. The stated space temperature gradient resulting from the gradual heating of airflow 35 is for this purpose compensated according to the invention by imposing a light gradient in parallel therewith. During the cultivation period the crop is thus exposed downstream, and in particular close to second side 2 of the cultivation space, to a higher dosage of PAR radiation daily than the crop being cultivated further upstream, in particular close to first side 1. The warmer the air climate to which the crop is subjected in climate cell 10, the more PAR radiation it hereby receives. In the shown setup the intensity of the fittings is particularly controlled in steps so as to be higher per row A . . . R or pairwise AB, BC, . . . , QR, whereby the light intensity increases stepwise from the first side to the second side, at least during the day parts of the cultivation period.

The result hereof is that the more rapid growth on the warmer second side is associated with an increased photosynthesis of the crop. The intensity of the light is particularly controlled such that the photosynthesis, and thereby the production of constituent substances in the crop, at least largely keeps pace with the more rapid growth so that a constituent substances content in the harvest-ready product will finally be largely uniform. For this purpose a local dosage of photosynthetically active radiation to which the crop is subjected is particularly geared to a local growth speed of the crop, and in particular regulated in direct proportion thereto by progressively operating the fittings 60 at a higher intensity. The crop will hereby be harvest-ready further downstream earlier than the crop which has been cultivated further upstream, and can therefore be harvested sooner. This product is however no different, or hardly so, in terms of size and content from the product which has been cultivated further upstream and which is harvested only several days or even weeks later.

The absolute height and the steepness of the temperature gradient in the airflow also depend on the air velocity and the airflow rate of the airflow guided through the space. Because the wall area of the first and second plenum walls remains constant, a balance between the air velocity and the light intensity ultimately defines the quality and uniformity of the harvested crop. Because of the independent control of the evaporation from the crop by means of the laminar flow, the moisture deficit and the air velocity in addition to the control of the space temperature and the intensity of the supplied PAR radiation (such as red and blue), the device according to the invention enables the grower to make and harvest a largely uniform product.

The cultivation method and the cultivation device according to the invention has been tested in practice on various crops. In the example given here use was made of the cultivation of lettuce. This has a standard cultivation cycle of five weeks, wherein about 10 grams per square metre per week of constituent substances particular dry matter) is produced. Because of the increasing space temperature in the flow direction of airflow 35 the crop grows about 20% more quickly on the outlet side 2 of the airflow than on the inlet side 1, and this speed will increase gradually therebetween. The light intensity of the fittings is however also set row-wise A . . . R to a higher level so that the final row gives about a 20% higher light intensity than the first row. In the row A . . . R fittings are operated with a light intensity at an equal level. The photosynthesis of the crop located furthest downstream, and thereby the production of solids in the crop, will hereby be about 20% more intensive than on inlet side 1. After about four weeks it will thus be possible to harvest a product on outlet side 2 of the same size and quality as is only harvestable on first side 1 two weeks later. Not only does this enhance the uniformity of the harvest product, the efficiency of the device is also significantly higher because the further downstream cultivation takes place as seen in the flow direction of the airflow, the shorter the cultivation cycle becomes.

The method according to the invention also has a favourable effect on the harvesting result in the cultivation of tomatoes. Tomatoes can develop into fruits of 100 g fresh in sixty days. At a higher temperature the time between blossom and harvest is shortened, for instance to fifty days. During this shortened time the higher radiation intensity provided according to the invention in this warmer part of the crop located further downstream provides overall for an assimilation which is about as high as the assimilation displayed by the plants located further upstream in sixty days. The warmer plants will hereby finally produce in fifty clays fruits of the same quality as the fruits located further upstream produced in sixty days.

Although the invention has been further elucidated above on the basis of only a single exemplary embodiment, it will be apparent that the invention is by no means limited thereto. On the contrary, many variations and embodiments are still possible within the scope of the invention for a person with ordinary skill in the art.

The invention claimed is:

1. A method for cultivating a crop in a daylight-free, climate-conditioned cultivation space, in which the cultivation space extends between a first side and an opposite second side such that an air temperature of the cultivation space on the second side is higher than an air temperature of the cultivation space on the first side, wherein the crop is exposed to photosynthetically active radiation from an array of spatially separated artificial light sources and wherein an airflow is guided over and/or through the crop in a direction running from the first side to the second side, wherein the array of artificial light sources is spatially distributed over the crop at least in the direction running from the first side to the second side and that a higher dosage of photosynthetically active radiation is provided to the crop with light sources of the array of light sources located further downstream than with light sources located further upstream as seen in the flow direction of the airflow guided over the crop.

2. The method as claimed in claim 1, wherein a local dosage of photosynthetically active radiation to which the crop is subjected is adapted to a local growth speed of the crop, and in particular is controlled in direct proportion thereto.

3. The method as claimed in claim 2, wherein products which are cultivated downstream are harvested earlier than products cultivated further upstream as seen in the flow direction of the airflow guided over and/or through the crop.

4. The method as claimed in claim 2, wherein downstream light sources of the array of light sources are operated at a higher intensity of photosynthetically active radiation than light sources located upstream.

5. The method as claimed in claim 2, wherein the airflow is guided as a laminar flow over the crop.

6. The method as claimed in claim 1, wherein products which are cultivated downstream are harvested earlier than products cultivated further upstream as seen in the flow direction of the airflow guided over and/or through the crop.

7. The method as claimed in claim 6, wherein downstream light sources of the array of light sources are operated at a higher intensity of photosynthetically active radiation than light sources located upstream.

8. The method as claimed in claim 6, wherein the airflow is guided as a laminar flow over the crop.

9. The method as claimed in claim 1, wherein downstream light sources of the array of light sources are operated at a higher intensity of photosynthetically active radiation than light sources located upstream.

10. Method The method as claimed in claim 9, wherein the airflow is guided as a laminar flow over the crop.

11. The method as claimed in claim 1, wherein the airflow is guided as a laminar flow over the crop.

12. The method as claimed in claim 11, wherein a higher dosage of photosynthetically active radiation is generated stepwise in a number of steps in the direction of the airflow with the light sources of the array of light sources, in particular by operating the light sources stepwise at a gradually higher intensity of photosynthetically active radiation.

13. A device for cultivating a crop, comprising a daylight-free, climate-conditioned cultivation space, in which the cultivation space extends between a first side and an opposite second side such that an air temperature of the cultivation space on the second side is higher than an air temperature of the cultivation space on the first side, at least one array of spatially separated artificial light sources for generating and emitting photosynthetically active radiation to which the crop is exposed, and comprising airflow means for guiding an airflow through the cultivation space in a direction running from the first side to the second side, wherein the array of artificial light sources is spatially distributed over the cultivation space at least in the direction running from the first side to the second side, and that light sources of the array of light sources located further toward the second side are able and configured to be operated at a higher overall dosage of photosynthetically active radiation than light sources located further toward the first side.

14. The device as claimed in claim 13, wherein the light sources comprise individual light fittings which are operated at a variable intensity of photosynthetically active radiation.

15. The device as claimed in claim 14, wherein the light fittings each comprise a number of light sources, in particular a number of light-emitting diodes (LEDs), in which the light sources are controllable individually or in groupwise manner within the fitting.

16. The device as claimed in claim 14, wherein the airflow means comprise on the first side a first plenum wall from which the airflow exits during operation as a laminar airflow, and that the airflow means comprise on the second side a second plenum wall in which the airflow is received during operation as a laminar airflow.

17. The device as claimed in claim 13, wherein the airflow means comprise on the first side a first plenum wall from which the airflow exits during operation as a laminar airflow, and that the airflow means comprise on the second side a second plenum wall in which the airflow is received during operation as a laminar airflow.

18. The device as claimed in claim 17, wherein circulation means are provided to guide back and circulate the airflow from the second side to the first side.

19. The device as claimed in claim 18, wherein the circulation means comprise air treatment means which are able and configured to treat the airflow before reintroducing the airflow into the cultivation space.

20. The device as claimed in claim 19, wherein the air treatment means impose at least one of a temperature, relative air humidity and a carbon dioxide concentration on the airflow.

* * * * *